United States Patent [19]
Bailey

[11] 4,094,645
[45] June 13, 1978

[54] COMBINATION MUFFLER AND CATALYTIC CONVERTER HAVING LOW BACKPRESSURE

[75] Inventor: Charles H. Bailey, Mt. Prospect, Ill.
[73] Assignee: UOP Inc., Des Plaines, Ill.
[21] Appl. No.: 762,228
[22] Filed: Jan. 24, 1977
[51] Int. Cl.² .......................... B01J 8/02; B01J 35/04; F01N 3/15
[52] U.S. Cl. .............................. 23/288 FC; 23/288 F; 60/299; 60/308
[58] Field of Search ........ 23/288 F, 288 FC, 288 FA, 23/288 FB; 60/298, 299, 301, 308; 181/36 C, 36 D, 72, 57, 231, 265, 258

[56] References Cited
U.S. PATENT DOCUMENTS

| | | | |
|---|---|---|---|
| 1,789,812 | 1/1931 | Frazer | 23/288 FC |
| 3,061,416 | 10/1962 | Kazokas | 23/288 F |
| 3,445,196 | 5/1969 | Thomas | 23/288 FC |
| 3,755,534 | 8/1973 | Graham | 23/288 FC UX |
| 3,841,841 | 10/1974 | Torosian et al. | 23/288 FA |
| 3,899,303 | 8/1975 | Gaysert | 23/288 F |
| 3,954,418 | 5/1976 | Stormont | 23/288 FA |

Primary Examiner—Morris O. Wolk
Assistant Examiner—Michael S. Marcus
Attorney, Agent, or Firm—James R. Hoatson, Jr.; Barry L. Clark; William H. Page, II

[57] ABSTRACT

Combination muffler and catalytic converter utilizes an axial flow monolithic catalytic element to treat exhaust gases from an internal combustion engine and partially reduce their sound. The device incorporates a venturi in the exhaust gas inlet path to add secondary air. The efficiency of the venturi is quite high since backpressures introduced downstream of the venturi are kept low by providing an extremely long outlet cone for the venturi which reverses the flow direction while preventing wall separation and turbulence. Sound attenuation is provided upstream of the venturi where the backpressures produced have minimum effect in reducing venturi efficiency.

7 Claims, 4 Drawing Figures

COMBINATION MUFFLER AND CATALYTIC CONVERTER HAVING LOW BACKPRESSURE

BACKGROUND OF THE INVENTION

This invention relates to mufflers and particularly to mufflers which include structure for fluid treatment in addition to structure for silencing. Catalytic converters for treating automotive exhaust gases are available in a variety of configurations. Although such devices are commonly provided as a separate unit in addition to the usual muffler, it is known to provide a combined muffler and catalytic converter unit as taught by U.S. Pat. No. 3,445,196, for example. Such a device is also disclosed in my copending application Ser. No. 737,129 filed Oct. 29, 1976 now U.S. Pat. No. 4,050,903, assigned to a common assignee.

To achieve efficient conversion of CO and HC it is necessary to provide secondary air upstream of the converter. In some instances, this air is supplied by an air pump which, of course, adds significant cost and some loss of energy. Perhaps the simplest way to add air is with a venturi. However, the amount of air drawn in by a simple venturi varies considerably as engine speed varies and is quite low at idle speeds where the mixture is usually richer and requires, proportionally, much more air than at faster speeds. This characteristic generally obviates the use of a simple venturi to add secondary air to the exhaust of an automotive engine. However, where idle speeds are relatively high and running speeds are not greatly higher, such as in lift truck applications, a simple venturi could be expected to provide sufficient secondary air to achieve satisfactory conversion. It is known in the prior art to add air upstream of an ordinary converter with a venturi. In such devices, there is usually ample distance between the venturi and catalyst so that adequate mixing of the air and exhaust gases can be achieved. Furthermore, there is little backpressure in such devices to decrease the efficiency of the venturi. However, an attempt to position an exhaust inlet and venturi quite close to a catalyst element in order to achieve a compact space package can result in a very substantial loss of conversion efficiency due to poor mixing of the secondary air with the exhaust gases.

SUMMARY

It is among the objects of the present invention to provide a combination muffler and catalytic converter device that performs well as both a muffler and converter while being economical to produce and capable of being housed in a relatively small package so that it can be used as an exact replacement for an existing muffler design.

An additional object of the invention is to provide a combination muffler-converter device which will introduce very little backpressure and be almost as efficient as the muffler alone which it replaces.

A venturi operation is very sensitive to backpressure and in fact causes most of the total backpressure in a combination muffler-converter. The invention takes advantage of the fact that a given percentage reduction in backpressure downstream of a venturi will provide a much greater overall reduction in backpressure than if the same percentage reduction in backpressure was made upstream of the venturi. For example, each unit of backpressure reduction downstream of the venturi will provide about two to three units of overall backpressure reduction. Since expansion chambers must be provided for noise attenuation, and such chambers produce backpressure, the invention provides that such chambers be located upstream of the venturi where they will cause much less of a total backpressure than if they were located downstream of the venturi.

To provide good mixing of the secondary air with the exhaust gases before the gases reach the catalytic element, it is necessary to either introduce turbulence and its consequent backpressure or provide a long flow path which gives sufficient time for diffusion of the gases. In the preferred embodiment, the outlet cone of the venturi is made extremely long and with a very gentle cone wall taper of no more than about $7\frac{1}{2}°$ so that wall separation of the gases will not occur and cause turbulence and the resultant increase in backpressure. In order to make the device as compact as possible, the outlet cone portions of the venturi are formed so as to cause the gases to make a 180° change in direction while maintaining a relatively constant cross-sectional flow area. The catalytic element is preferably of the monolithic axial flow type having an annular cross-section. The first portion of the venturi outlet cone comprises an elongated metal member positioned axially and interiorly of the monolithic element so that the gases are directed toward the end of the outer housing which is opposite the inlet end. This end is curved or dished so as to redirect the gases radially outwardly into a second cone-shaped outlet portion defined by the housing and the outer wall of the aforementioned first cone portion.

DESCRIPTION OF THE PREFERRED EMBODIMENT

Figure 1:
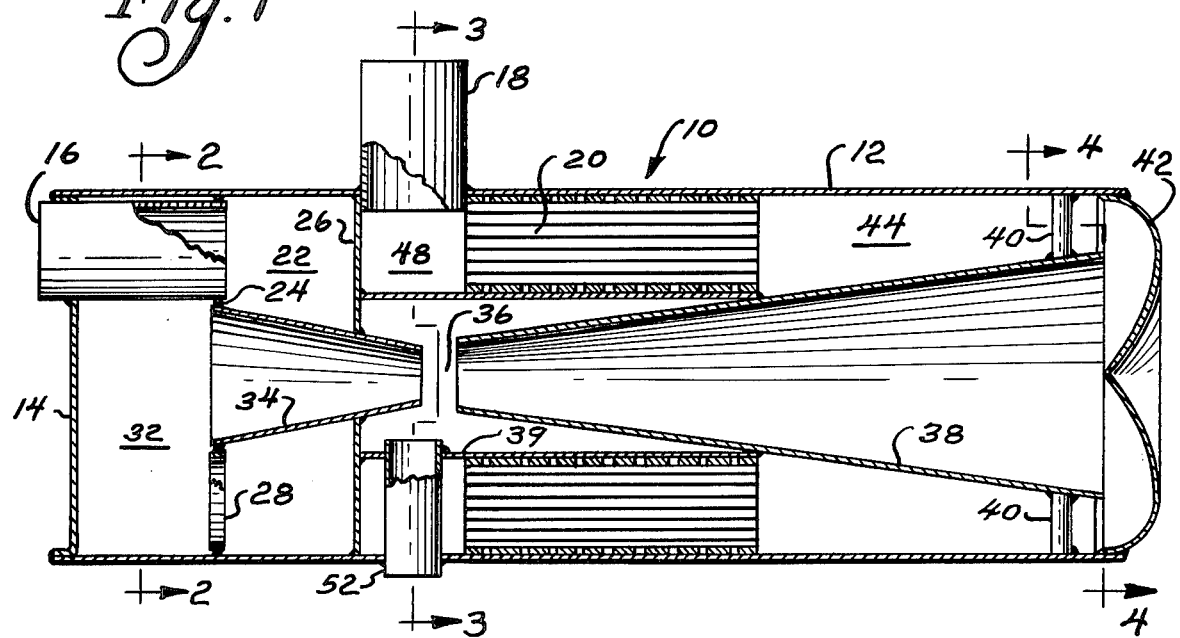
FIG. 1 is a side sectional view of a combination muffler-converter incorporating the invention, the view being taken on line 1—1 of FIG. 2.
Figure 2:
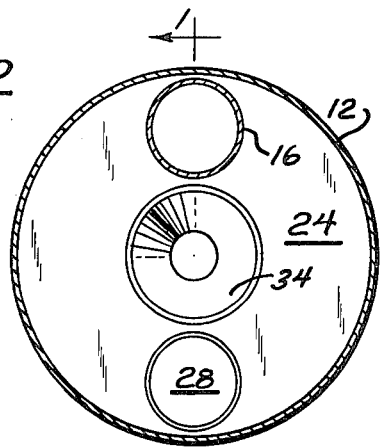
FIGS. 2-4 are sectional views taken on lines 2—2, 3—3, and 4—4 of FIG. 1.
Figure 4:
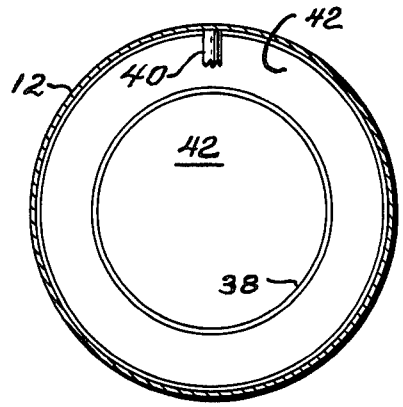
Figure 3:
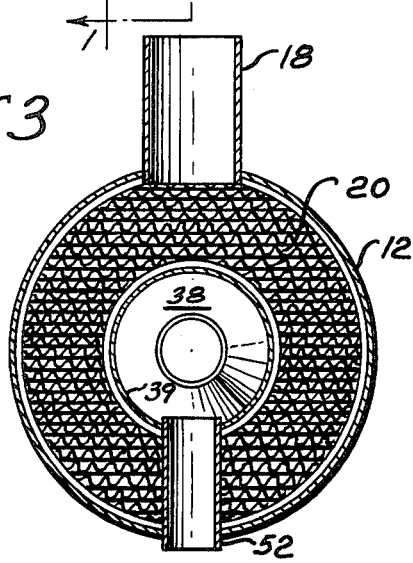

Referring to FIG. 1, the combination muffler-catalytic converter assembly indicated generally at 10 can be seen as comprising an outer metal housing or wrapper member 12 of generally cylindrical shape having an inlet bulkhead member 14 joined to its inlet end. An exhaust gas inlet tube 16 is axially mounted in the inlet bulkhead member 14 such as by welding and an exhaust gas outlet tube 18 is radially mounted in the side wall of the housing 12 immediate its ends. An axial flow monolithic catalyst element 20 having an annular cross section is positioned inside the housing 12 to remove impurities from the exhaust gas before it exits from tube 18.

As exhaust gases enter the inlet tube 16 they pass into a first expansion chamber 22 defined by bulkhead members 24, 26 affixed by welding at their peripheral edges to the cylindrical housing 12. The exhaust gases undergo a rapid expansion in the chamber 22 so that a portion of their noise is attenuated. The gases then exit through outlet opening 28 formed in bulkhead 24 and undergo a second rapid expansion in a second expansion chamber 32. Additional sound attenuation is caused by the second expansion as well as by the change in direction of flow as the gases pass from one chamber to the next and then to venturi inlet cone 34. The inlet cone member 34 is supported near its inlet end by the bulkhead member 24 and near its outlet end by bulkhead member 26. The gases leave the inlet cone 34 at an increased velocity and reduced pressure and pass through the venturi throat area 36 and into the outlet cone member 38 which comprises a first outlet cone portion. The outlet cone member 38 is supported intermediate its ends by an axially extending cylindrical member 39 which is in turn carried by the bulkhead 26. The outlet end of the cone member 38 is supported by the interior wall of the housing 12 by means of a plurality of rod members 40. As the gases exit from cone member 38, they impinge on the outlet bulkhead member 42 which is formed in the curved or dished cross-sectional shape shown in FIG. 1 so that the gases will be gently reversed in direction and directed outwardly into the annular chamber 44 comprising the second portion of the outlet venturi cone which is defined by the inner wall of housing 12 and the outer wall of cone member 38. The cross-sectonal flow area is preferably constant throughout the transition region between the outer end of cone member 38 and the chamber 44 so that as little turbulence as possible will be introduced into the gases. The included angle of the cone portion 38 and of the annular chamber 44 is preferably about $7\frac{1}{2}°$ or less since greater angles would tend to cause too rapid an expansion of the gases and resulting turbulence-inducing wall separation of the gases. As the gently expanding gases leave the annular chamber 44 they first pass through the axial channels of the monolith catalyst element 20 where they are treated and then into the outlet chamber 48 from which they exit the device 10 through exhaust outlet tube 18.

As previously noted, the purpose of the venturi is to induce secondary air into the exhaust gas stream in order to enhance the conversion of pollutants in the exhaust gas into harmless gases. The secondary air enters the device 10 through a secondary air inlet tube 52 inserted through the side of the cylindrical housing 12 and through the cylindrical member 39 into communication with the verturi throat area 36.

I claim as my invention:

1. In a combination muffler and catalytic converter having a housing with inlet and outlet openings for exhaust gases, a monolithic, axial flow catalytic converter element, secondary air inlet means and a venturi for introducing secondary air into the exhaust gas stream before it reaches the catalytic converter element and for controlling the flow of exhaust gases to said catalytic converter element, the improvement comprising at least two serially arranged expansion chamber means located within said housing between said inlet and said venturi, said at least two serially arranged expansion chamber means comprising a first expansion chamber positioned axially inwardly of the inlet end of said housing and spaced therefrom by a second expansion chamber, said first chamber having the inlet cone portion of said venturi located therein and inlet means for communicating the second expansion chamber with said first expansion chamber, said second expansion chamber having a tube therein connecting and communicating the inlet opening of said housing with said first expansion chamber, whereby exhaust gases entering said inlet tube must undergo at least a 360° change in direction in passing from said inlet tube to said inlet cone portion, and gas restriction means extending over the entire gas flow path between the throat of said venturi and the inlet end of said catalytic converter element for controlling the expansion rate of the exhaust gases relatively uniformly over said entire gas flow path to minimize the turbulation of the gas stream, said gas expansion restriction means limiting the expansion rate of the exhaust gases to a rate no greater than the rate present in the expansion cone portion of the venturi immediately downstream of the venturi throat which has an included angle with its axis no greater than about $7\frac{1}{2}°$.

2. The combination muffler and catalytic converter device of claim 1 wherein said gas expansion restriction means includes an expansion cone member which incorporates said expansion cone portion and which terminates short of an end wall of said device and a tapered annular chamber between portions of the outer wall of the expansion cone member and the inner wall of the housing.

3. The combination muffler and catalytic converter device of claim 2 wherein the catalytic converter element is of an annular shape and includes axial flow channels in alignment with the tapered annular chamber, said catalytic converter element being shorter in axial length than said cone member and being positioned in a radial space intermediate the inlet end of said cone member and the inner wall of the housing.

4. The combination muffler and catalytic converter device of claim 3 wherein said device includes an annular gas outlet chamber positioned intermediate the exit end of the catalytic converter element and a bulkhead defining the innermost wall of said expansion chamber means.

5. The combination muffler and catalytic converter device of claim 4 wherein said exhaust gas outlet opening comprises a tube mounted in the housing in communication with said gas outlet chamber and said secondary air inlet means comprises an air supply tube mounted therein diametrically opposite said gas outlet opening, said secondary air supply tube being mounted so as to pass through said annular gas outlet chamber and into communication with the throat region of the venturi.

6. The combination muffler and catalytic converter device of claim 2 wherein the exhaust gases are reversed in directon as they pass radially outwardly from the exit end of the expansion cone member to the entrance end of the tapered annular chamber and the exit area of the expansion cone member, the entrance area of the tapered annular chamber, and the radial flow area between the end of the cone member and said end wall being approximately equal.

7. The combination muffler and catalytic converter device of claim 6 wherein the end wall of the device is curved or dished to smoothly guide the gases radially outwardly toward the tapered annular chamber as they leave the cone member.

* * * * *